(12) United States Patent
Chou et al.

(10) Patent No.: US 10,732,725 B2
(45) Date of Patent: Aug. 4, 2020

(54) METHOD AND APPARATUS OF INTERACTIVE DISPLAY BASED ON GESTURE RECOGNITION

(71) Applicant: XRSpace CO., LTD., Taoyuan (TW)

(72) Inventors: Peter Chou, Taipei (TW); Feng-Seng Chu, New Taipei (TW); Yen-Hung Lin, Taoyuan (TW); Shih-Hao Ke, New Taipei (TW); Jui-Chieh Chen, Taipei (TW)

(73) Assignee: XRSpace CO., LTD., Taoyuan (TW)

( * ) Notice: Subject to any disclaimer, the term of this patent is extended or adjusted under 35 U.S.C. 154(b) by 0 days.

(21) Appl. No.: 16/141,966

(22) Filed: Sep. 25, 2018

(65) Prior Publication Data

US 2020/0097091 A1   Mar. 26, 2020

(51) Int. Cl.
*G06F 3/01* (2006.01)
*G06K 9/00* (2006.01)

(52) U.S. Cl.
CPC ......... *G06F 3/017* (2013.01); *G06K 9/00355* (2013.01)

(58) Field of Classification Search
CPC ...... G06F 3/04845; G06F 3/017; G06F 3/014; G06F 3/005; G06F 3/01; G06F 3/011
See application file for complete search history.

(56) References Cited

U.S. PATENT DOCUMENTS

| | | | |
|---|---|---|---|
| 8,558,759 B1 | 10/2013 | Gomez | |
| 8,824,802 B2 | 9/2014 | Kutliroff | |
| 2012/0113223 A1 | 5/2012 | Hilliges | |
| 2012/0133580 A1 | 5/2012 | Kirby | |
| 2012/0327125 A1 | 12/2012 | Kutliroff | |
| 2013/0328769 A1* | 12/2013 | Jung | G06F 3/017 345/156 |
| 2014/0282274 A1 | 9/2014 | Everitt | |
| 2017/0038850 A1 | 2/2017 | Fleishman | |
| 2017/0315620 A1* | 11/2017 | Johri | G06F 3/014 |
| 2019/0073040 A1* | 3/2019 | Luchner | B60K 35/00 |

FOREIGN PATENT DOCUMENTS

| | | |
|---|---|---|
| JP | 2010-534895 A | 11/2010 |
| JP | 2012-160051 A | 8/2012 |
| JP | 2014-235634 A | 12/2014 |
| JP | 2016-520946 A | 7/2016 |
| JP | 2017-111537 A | 6/2017 |
| WO | 2018/127782 A1 | 7/2018 |

OTHER PUBLICATIONS

Search Report dated May 29, 2019 for EP application No. 18212822.3, pp. 1-8.
Office action dated Dec. 30, 2019 for TW application No. 107141151, filed Nov. 20, 2018, pp. 1-5.
Office Action dated Feb. 18, 2020 for the Japanese Application No. 2018-227011, filing date Dec. 4, 2018, pp. 1-4.

* cited by examiner

*Primary Examiner* — Gerald Johnson
(74) *Attorney, Agent, or Firm* — Winston Hsu

(57) ABSTRACT

A method of interactive display based on gesture recognition includes determining a plurality of gestures corresponding to a plurality of images, interpreting a predetermined combination of gestures among the plurality of gestures as a command, and displaying a scene in response to the command.

24 Claims, 6 Drawing Sheets

Release          Hold          Release

METHOD AND APPARATUS OF INTERACTIVE DISPLAY BASED ON GESTURE RECOGNITION

BACKGROUND OF THE INVENTION

1. Field of the Invention

The invention relates to a method and apparatus of interactive display, and more particularly, to a method and apparatus of interactive display based on gesture recognition.

2. Description of the Prior Art

Image processing is widely used in a variety of applications, which may involve two-dimensional (2D) images, three-dimensional (3D) images, or combinations of multiple images of different types. For example, 3D images may be directly generated using a depth imager such as a structured light (SL) camera or a time of flight (ToF) camera. Such 3D images are also referred to herein as depth images, and commonly utilized in machine vision applications including those involving gesture recognition.

In a typical gesture recognition arrangement, raw image data from an image sensor is usually subject to various preprocessing operations. The preprocessed image data is then subject to additional processing used to recognize gestures in the context of particular gesture recognition applications. Such applications may be implemented in video gaming systems, kiosks or other systems providing a gesture-based user interface, for example, electronic consumer devices such as virtual reality devices, laptop computers, tablet computers, desktop computers, mobile phones, interactive projectors and television sets.

Therefore, the algorism for gesture recognition becomes crucial to facilitate the interaction between the user and the electronic device.

SUMMARY OF THE INVENTION

It is therefore an objective of the present invention to provide a method and apparatus of interactive display based on gesture recognition for interactive display system.

The present invention discloses a method of interactive display based on gesture recognition. The method includes determining a plurality of gestures corresponding to a plurality of images, interpreting a predetermined combination of gestures among the plurality of gestures as a command, and displaying a scene in response to the command.

The present invention further discloses an apparatus for an interactive display system and including a processing device, and a memory device, wherein the memory device is coupled to the processing device, and configured to store the method of interactive display as above mentioned as a process of interactive display, to instruct the processing device to execute the process of interactive display.

The interactive display system of the present invention detects the predetermined combination of gestures performed by the user to instruct the interactive display system to give response to the user, e.g., the display device displays a different scene in a video game after the view angle of the player is changed, or displays a moving object in the video game. Therefore, the user may interact with the interactive display system without physical contact to any user input devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
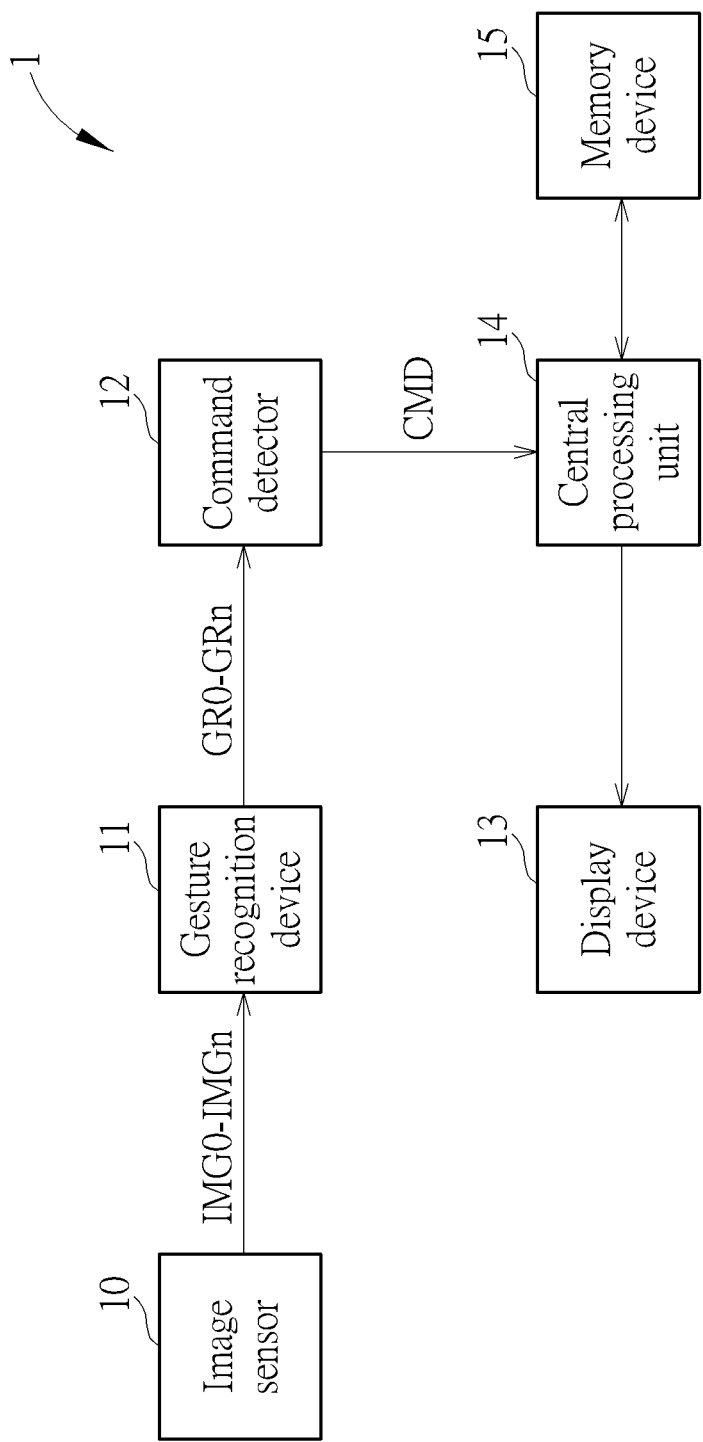
FIG. 1 is a functional block diagram of an interactive display system according to an embodiment of the present invention.

FIG. 1 is a functional block diagram of an interactive display system 1 according to an embodiment of the present invention. The interactive display system 1 includes an image sensor 10, a gesture recognition device 11, a command detector 12, a display device 13, a central processing unit (hereinafter abbreviated CPU) 14, and a memory device 15.

The image sensor 10 is coupled to the gesture recognition device 11, and configured to generate a plurality of images IMG0-IMGn to the gesture recognition device 11. The gesture recognition device 11 is coupled to the image sensor 10 and the command detector 12, and configured to determine a plurality of gestures GR0-GRn corresponding to the plurality of images IMG0-IMGn for the command detector 12. The command detector 12 is coupled to the gesture recognition device 11 and the CPU 14, and configured to interpret the plurality of gestures GR0-GRn as a command CMD for the CPU 14. The CPU 14 is coupled to the command detector 12, the display device 13 and the memory device 15, and configured to output image data to the display device 13 according to the command CMD. The display device 13 is coupled to the CPU 14, and configured to display a scene.

In an embodiment, the image sensor 10 may be a depth imager such as a structured light (SL) camera or a time of flight (ToF) camera configured to generate 3-dimensional (3D) images with an object of interest. For example, the image sensor 10 may generate the 3D images IMG0-IMGn with a user's hand.

In an embodiment, the gesture recognition device 11 may identify a plurality of points of interest corresponding to the object of interest from the 3D images IMG0-IMGn, and determine the gestures GR0-GRn corresponding to the images IMG0-IMGn according to relative positions of the plurality of points of interest. For example, the points of interest may be fingertips and a palm of the user's hand, wherein the points of interest respectively correspond to 3D coordinates within a spatial projection range of the image sensor 10; and the gesture recognition device 11 determines the gestures GR0-GRn according to relative positions of the fingertips and the palm of the user's hand.

In an embodiment, the gesture recognition may be performed by machine learning, for example, the gesture recognition device 11 may be a neural network model that is trained by data sets of 3D images, and the neural network model produces an outcome corresponding to an input image.

In an embodiment, the command detector 12 may interpret a predetermined combination of gestures as the command CMD. For example, in the interactive display system 1, the predetermined combination of gestures refers to continuous movements of the user's fingertips and palm for instructing the interactive display system 1 to give responses to the user, e.g., change a view angle of a player in a video game, move an object in the video game, and so on.

The predetermined combination of gestures may be a sequence of a first gesture, a second gesture and the first gesture. In other words, the user may repeat the first gesture after the second gesture is made to instruct the interactive display system 1 to give response to the predetermined combination of gestures, e.g., the display device displays a different scene in the video game after the view angle of the player is changed, or displays a moving object in the video game. Therefore, the user may interact with the interactive display system 1 without physical contact to any user input devices.

FIG. 2 to FIG. 5 illustrates exemplary 3D images with a predetermined combination of gestures for single hand according to various embodiments of the present invention. The gesture recognition device 11 may identify the fingertips of thumb, index finger, middle finger, ring finger and little finger P1-P5, a center of palm P0 of the hand, joints J1-J5 of the hand.

Figure 2:
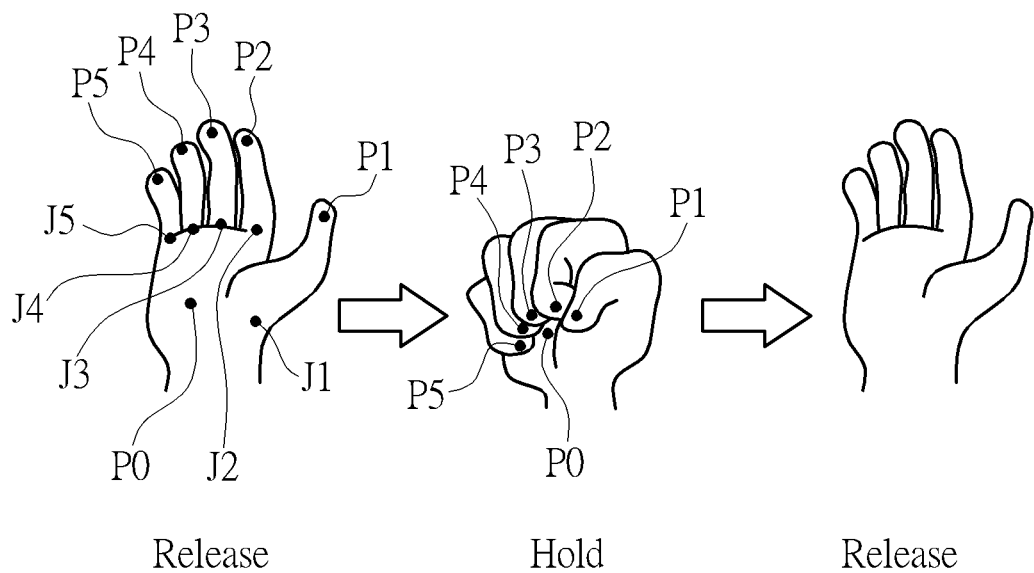
FIG. 2 to FIG. 5 illustrates exemplary 3D images with gestures of single hand according to various embodiments of the present invention.

In FIG. 2, a "grab" command is interpreted when a predetermined combination of "release", "hold", and "release" gestures is recognized. For recognizing the "release" gesture, when detecting that distances between the fingertips P1-P5 and the center of palm P0 are within predetermined ranges and an angle between vectors P0J1 and P1J1 within a range (i.e., the fingertip of thumb points away from the palm), the gesture recognition device 11 may recognize the "release" gesture. For recognizing the "hold" gesture, when detecting that distances between the fingertips P1-P5 and the center of palm P0 are within a range or approximate to zero (i.e., the fingertips P1-P5 moving toward the center of palm P0 to make a fist), the gesture recognition device 11 may recognize the "hold" gesture.

Figure 3:
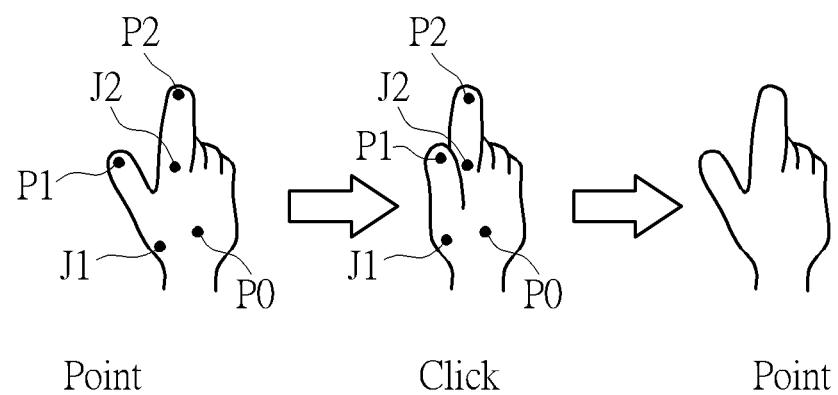

In FIG. 3, a "teleport" command is interpreted when a predetermined combination of "point", "click", and "point" gestures is recognized. For recognizing the "point" gesture, when detecting that the vector P2J2 is parallel to the vector J1J2, an angle between vectors P1J1 and P2J2 is within a range, and distances between the fingertips P3-P5 and the center of palm P0 are within a range, the gesture recognition device 11 may recognize the "point" gesture.

For recognizing the "click" gesture, when detecting that the vector P2J2 is parallel to the vectors J1J2 and P1J1 (or, the angle between the vectors P2J2, J1J2 and P1J approximates to zero), distances between the fingertips P1-P2 and the center of palm P0 are greater than a range, and distances between the fingertips P3-P5 and the center of palm P0 are within a range, the gesture recognition device 11 may recognize the "click" gesture. In one embodiment, when detecting that the fingertip of thumb is moving toward the joint of index finger and the palm, and the fingertips of middle, ring and little finger stay close to the palm, the gesture recognition device 11 may recognize the "point" gesture.

Take a video gaming system for example, the CPU 14 or other image analysis modules may map the pointing direction of the index finger (e.g., the vector P2J2) onto a spatial projection range of a scene displayed by the display device 13, the gesture recognition device 11 detects the predetermined combination of "point", "click", and "point" gestures to output the "teleport" command, and then the CPU 14 generates a new scene based on the pointing direction of the index finger and the "teleport" command to the display device 13 to display the new scene to the user. Therefore, the user may interact with the interactive display system 1 without physical contact to any user input devices.

Figure 4:
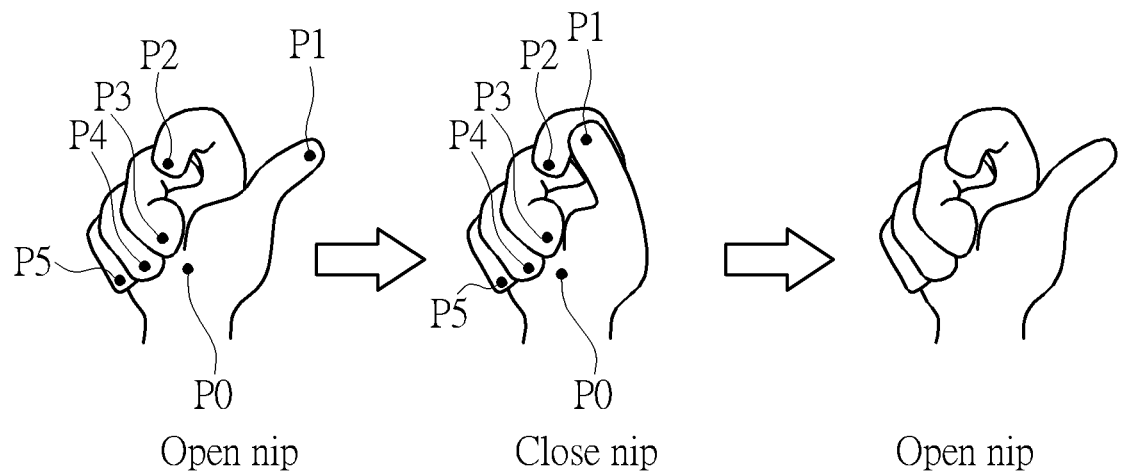

In FIG. 4, a "key in" command is interpreted when a predetermined combination of "open nip", "close nip", and "open nip" gestures is recognized. For recognizing the "open nip" gesture, when detecting that distances between the fingertips P3-P5 and the center of palm P0 are within a range, a distance between the index fingertip P2 and the center of palm P0 is within a range and there is an angle within a range between the thumb and palm, the gesture recognition device 11 may recognize the "open nip" gesture. For recognizing the "close nip" gesture, when detecting that the fingertip of thumb touches the fingertip of index finger (or a distance between the points P1 and P2 is within a range or approximates to zero), the gesture recognition device 11 may recognize the "close nip" gesture.

Figure 5:
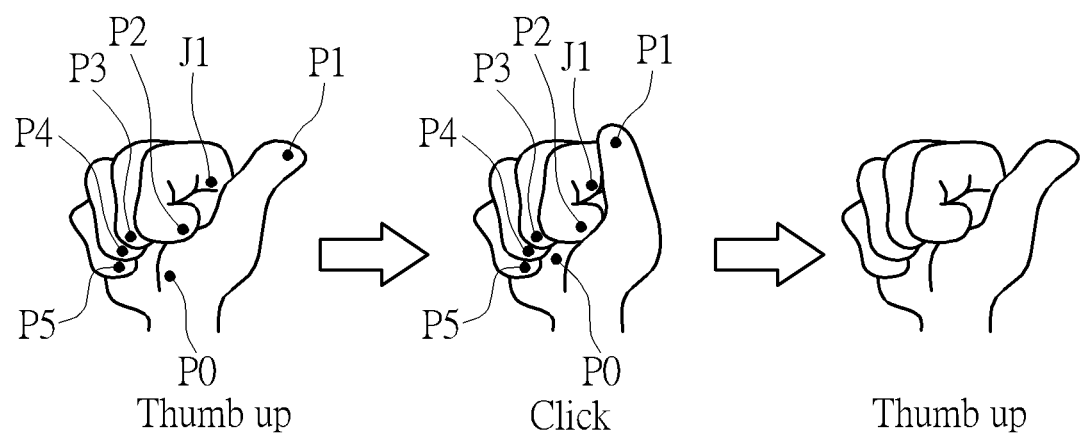

In FIG. 5, a "duplicate" command is interpreted when a predetermined combination of "thumb up", "click", and "thumb up" gestures is recognized. For recognizing the "thumb up" gesture, when detecting that distances between the fingertips P2-P5 and the center of palm P0 are within a range and there is an angle within a range between the thumb and palm, the gesture recognition device 11 may recognize the "thumb up" gesture.

In summary of the embodiments of FIG. 2 to FIG. 5, the hand gesture can be recognized based on relative positions of the fingertips and the center of the palm, the gesture recognition device 11 may recognize the gesture according to conditions set by the relative positions of the fingertips and the center of the palm. Those skilled in the art may make modifications and alterations accordingly, which is not limited.

In other embodiments, the CPU 14 or other image analysis modules (e.g., virtual object generation device) may project at least one object of interest (e.g., single hand or both hands) in the 3D images IMG0-IMGn as well as a virtual object of interest in a spatial projection range of a scene displayed by the display device 13, and the user may interact with the virtual object of interest by hand gestures. In an embodiment, the virtual object generation device may perform mesh generation or grid generation to generate the virtual object, and the user may input commands by hand gestures to instruct the interactive display system 1 to give response to the input commands, e.g., the display device displays an enlarged, shrinking or rotating virtual object or a pop up window based on the input commands.

Figure 6:
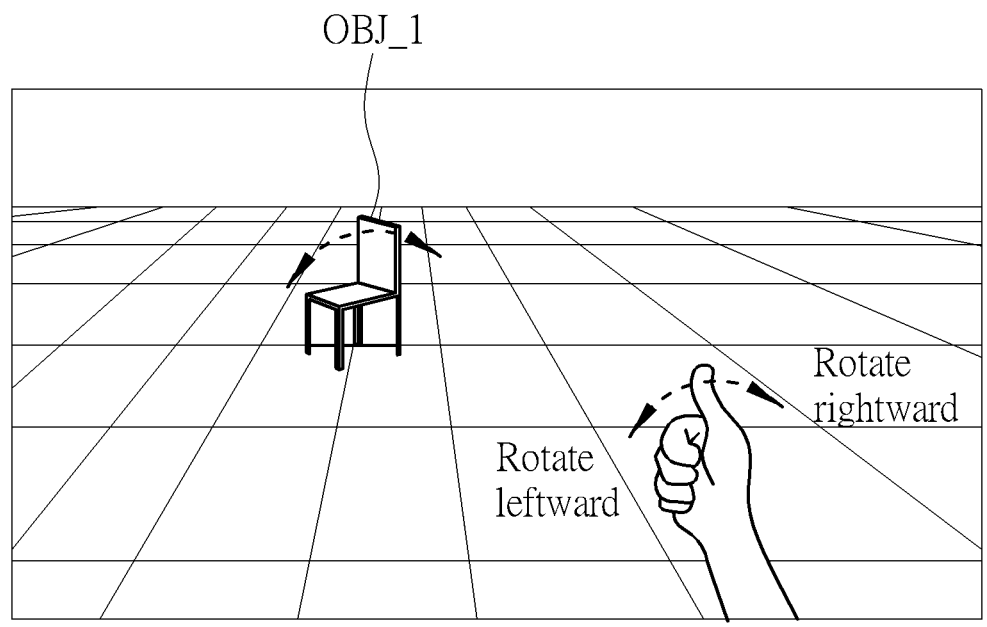
FIG. 6 to FIG. 8 illustrates an interaction between a hand and a virtual object according to various embodiment of the present invention.
Figure 7:
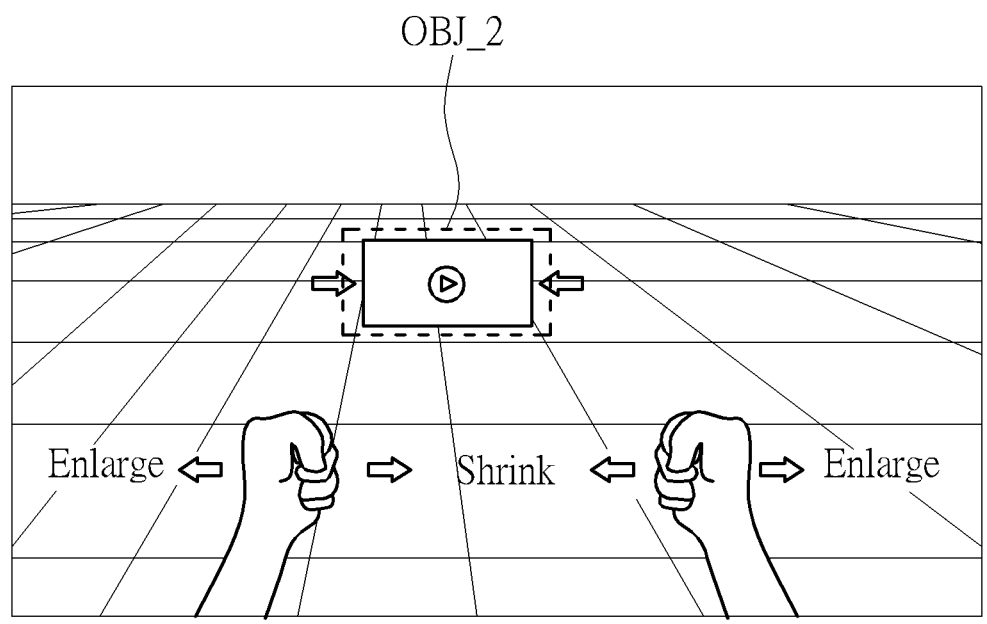
Figure 8:
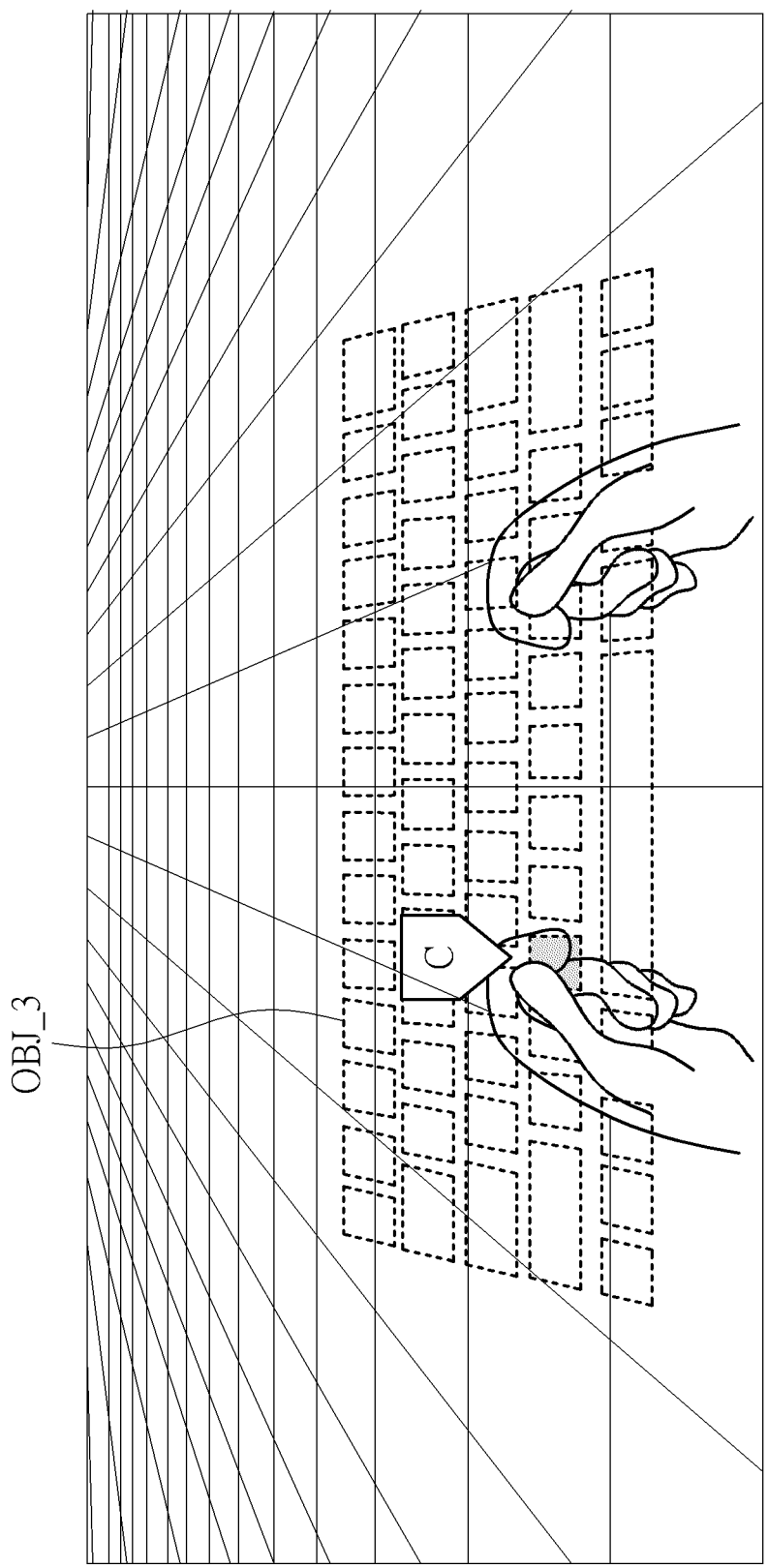

FIG. 6 to FIG. 8 illustrates an interaction between single hand or both hands and a virtual object according to various embodiments of the present invention.

In FIG. 6, the user may select a virtual object of interest OBJ_1 displayed by the display device 13 by making the "grab" command as mentioned in the embodiment of FIG. 2, and the user may further interact with the virtual object of interest OBJ_1 by hand gestures. The command detector 12 may detect a "rotate leftward" or "rotate rightward" command by tracking a movement of a detected gesture, e.g. "thumb up".

The "thumb up" gesture is interpreted as long as the relative positions between the fingertips P1-P5 and the center of the palm P0 remain unchanged since the conditions corresponding to the "thumb up" gesture remain unchanged. In one embodiment, the movement of the "thumb up" gesture may be represented by the movement of the fingertip of thumb P1, the command detector 12 may track the movement of the fingertip of thumb P1 by computing coordinate displacement of the fingertip of thumb P1 identified in the 3D images IMG0-IMGn, so as to determine whether the "thumb up" gesture rotates leftward or rightward. For example, when the "thumb up" gesture has been detected and the fingertip of thumb P1 moves to a down-left or down-right in the spatial projection range of the display device 13, the command detector 12 may determine the "rotate leftward" or "rotate rightward" command. The fingertip of thumb P1 may be a designated point of interest that is associated with the detected "thumb up" gesture.

In FIG. 7, the user may use both hands to interact with a virtual object of interest OBJ_2 displayed by the display device 13. The gesture recognition device 11 may recognize the "hold" gesture for left and right hands of the user, and the command detector 12 may detect an "enlarge" or "shrink" command by tracking movements of detected gestures of both hands, e.g. "hold".

The "hold" gestures of both hands are detected as long as the relative positions between the fingertips P1-P5 and the center of the palm P0 remain unchanged since the conditions corresponding to the "hold" gestures remain unchanged. In an embodiment, the movements of the "hold" gestures of both hands may be represented by the movements of the centers of palm P0 of both hands (or any one of points P1-P5 and J1-J5 of interest), the command detector 12 may track the movement of the center of palm P0 by computing coordinate displacement of the centers of palm P0 of both hands identified in the 3D images IMG0-IMGn, so as to determine whether the "hold" gestures of both hands move closer or farther. For example, when the "hold" gestures of both hands have been detected and the centers of palm P0 of both hands move closer or farther in the spatial projection range of the display device 13, the command detector 12 may determine the "enlarge" or "shrink" command. For example, sizes of the virtual object of interest OBJ_2 are proportional to the coordinate displacement of the center of palm P0 of single hand or the coordinate displacement of the centers of palm P0 of both hands.

In FIG. 8, the user may use one or another hand to interact with a virtual object of interest OBJ_3 displayed by the display device 13. In this embodiment, the virtual object of interest OBJ_3 is a keyboard, and includes a plurality of sub-objects of interest. For example, the keyboard includes a plurality of keys corresponding to a plurality of characters.

The user may move either left or right hand to where one of the plurality of keys in the spatial projection range of the display device 13, and then perform the "key in" command by performing the predetermined combination of "open nip", "close nip", and "open nip" gestures. The CPU 14 may determine the character corresponding to the "key in" command according to a location (or designated point) corresponding to the "key in" command, wherein the designated point may be the fingertip P1 of thumb or the fingertip P2 of index finger identified from the "close nip" gesture of the "key in" command. Then, the CUP 14 may instruct the display device 13 to display a pop up window with the character corresponding to the "key in" command. For example, the user may move the left hand to where a key corresponding to a character "C" is projected in the spatial projection range of the display device 13, and perform the "key in" command. The CPU 14 may determine the character "C" is inputted by the user according to the detected "key in" command and the corresponding designated point, so as to instruct the display device 13 to display the pop up window with the character "C".

Figure 9:
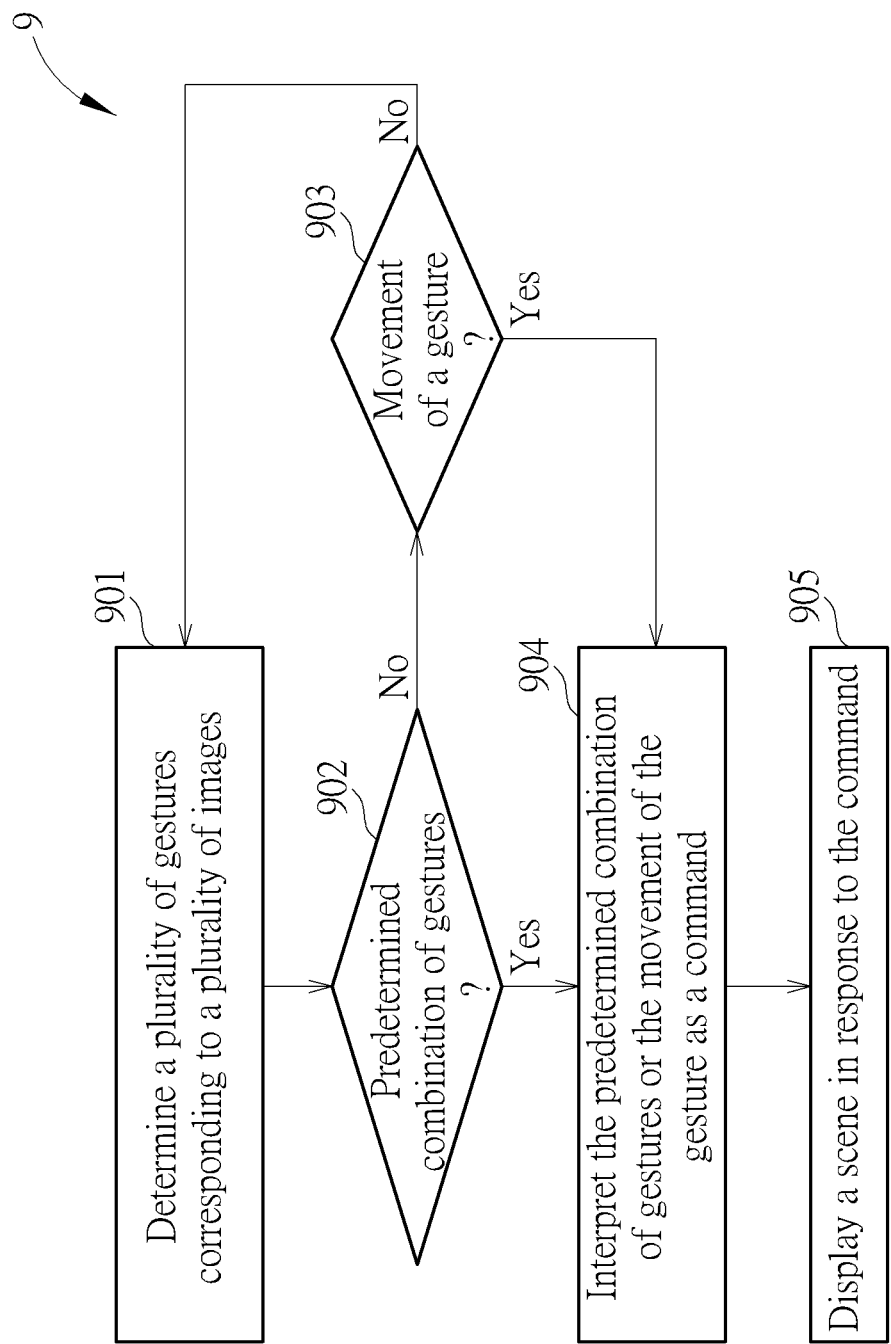
FIG. 9 is a flowchart of an interactive display process according to an embodiment of the present invention.

Operations of the interactive display system 1 may be summarized into an interactive display process 9, as shown in FIG. 9, and the interactive display process 8 includes the following steps.

Step 901: Determine a plurality of gestures corresponding to a plurality of images.

Step 902: Determine whether a predetermined combination of gestures among the plurality of gestures is detected? Go to Step 904 if yes; go to Step 803 if no.

Step 903: Determine whether a movement of a gesture among the plurality of gestures is detected? Go to Step 904 if yes; return to Step 901 if no.

Step 904: Interpret the predetermined combination of gestures or the movement of the gesture as a command.

Step 905: Display a scene in response to the command.

In the interactive display process 9, Step 901 is performed by the gesture recognition device 11, Steps 902 to 904 are performed by the command detector 12, and Step 805 is performed by the CUP 14 and the display device 13. Detailed operation of the interactive display process 9 may be obtained by referring to descriptions regarding FIG. 1 to FIG. 8.

To sum up, the interactive display system of the present invention detects the predetermined combination of gestures or the movement of the gesture performed by the user to instruct the interactive display system to give response to the user, e.g., the display device displays a different scene in the video game after the view angle of the player is changed, or displays a moving object in the video game. Therefore, the user may interact with the interactive display system without physical contact to any user input devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of interactive display for an electronic device, comprising:
   determining a plurality of gestures corresponding to a plurality of images, comprising:
      identifying a first object of interest in the plurality of images;
      identifying a plurality of points of interest of the first object of interest;
      detecting a plurality of distances between the plurality of points of interest of the first object of interest;
      detecting an angle between a first vector and a second vector, wherein the plurality of points of interest comprises a first point of interest, a second point of interest, a third point of interest and a fourth point of interest, the first vector is made by the first point of interest and the second point of interest, the second vector is made by the third point of interest and the fourth point of interest; and
      determining each of the plurality of gestures according to the plurality of distances between the plurality of points of interest and the angle between the first vector and the second vector;
   interpreting a predetermined combination of gestures among the plurality of gestures as a first command; and
   displaying a first scene in response to the first command.

2. The method of claim 1, wherein the predetermined combination of gestures is a sequence of a first gesture, a second gesture, and the first gesture.

3. The method of claim 1,
wherein the first object of interest is a first hand of a user, and the plurality of points of interest comprises fingertips of thumb, index finger, middle finger, ring finger and little finger, joints of thumb, index finger, middle finger, ring finger and little finger and a palm of the first hand.

4. The method of claim 1, further comprising:
identifying a virtual object of interest in the plurality of images; and
selecting the virtual object of interest in response to the first command.

5. The method of claim 4, further comprising:
tracking a movement of one of the plurality of gestures;
interpreting the movement of one of the plurality of gestures as a second command; and
displaying a second scene in response to the second command.

6. The method of claim 5, wherein tracking the movement of one of the plurality of gestures comprises:
tracking a movement of a designated point among the plurality of points of interest of the first object of interest, wherein the designated point of interest is associated with the one of the plurality of gestures.

7. The method of claim 4, wherein determining the plurality of gestures corresponding to the plurality of images comprises:
identifying a second object of interest in one of the plurality of images;
identifying a plurality of points of interest of the second object of interest; and
determining gestures of the first and second objects of interest according to the plurality of points of interest of the first and second objects of interest;
wherein the first object of interest is a first hand of a user, the second object of interest is a second hand of the user.

8. The method of claim 7, wherein determining the plurality of gestures corresponding to the plurality of images comprises:
tracking movements of the gestures of the first and second objects of interest;
interpreting the movements of the first and second objects of interest as a second command; and
displaying a second scene in response to the second command.

9. The method of claim 8, wherein tracking the movements of the gestures of the first and second objects of interest comprises:
tracking movements of a first designated point among the plurality of points of interest of the first object of interest and a second designated point among the plurality of points of interest of the second object of interest, wherein the first and second designated point of interest is associated with the gestures of the first and second objects of interest.

10. The method of claim 1, further comprising:
identifying a virtual object of interest in the plurality of images, wherein the virtual object of interest comprises a plurality of sub-objects of interest corresponding to a plurality of characters; and
determining one of the plurality of characters corresponding to one of the plurality of sub-objects of interest according to a designated point corresponding to the first command;
wherein displaying the first scene in response to the first command comprises:
displaying a pop up window with the one of the plurality of characters corresponding to the first command.

11. The method of claim 10, wherein determining one of the plurality of characters corresponding to one of the plurality of sub-objects of interest according to the designated point corresponding to the first command comprises:
determining the designated point corresponding to the first command among the plurality of points of interest;
wherein the first object of interest is a first hand of a user, the plurality of points of interest comprises fingertips of the first hand, and the designated point is a fingertip of thumb or a fingertip of index finger of the first hand.

12. An apparatus for an interactive display system, comprising:
a processing device; and
a memory device coupled to the processing device, and configured to store a process of interactive display to instruct the processing device to execute the process of interactive display, wherein the process of interactive display comprises:
determining a plurality of gestures corresponding to a plurality of images, comprising:
identifying a first object of interest in the plurality of images;
identifying a plurality of points of interest of the first object of interest;
detecting a plurality of distances between the plurality of points of interest of the first object of interest;
detecting an angle between a first vector and a second vector, wherein the plurality of points of interest comprises a first point of interest, a second point of interest, a third point of interest and a fourth point of interest, the first vector is made by the first point of interest and the second point of interest, and the second vector is made by the third point of interest and the fourth point of interest; and
determining each of the plurality of gestures according to the plurality of distances between the plurality of points of interest and the angle between the first vector and the second vector;
interpreting a predetermined combination of gestures among the plurality of gestures as a first command; and
outputting a first scene in response to the first command.

13. The apparatus of claim 12, wherein the predetermined combination of gestures is a sequence of a first gesture, a second gesture, and the first gesture.

14. The apparatus of claim 12,
wherein the first object of interest is a first hand of a user, and the plurality of points of interest comprises fingertips of thumb, index finger, middle finger, ring finger and little finger, joints of thumb, index finger, middle finger, ring finger and little finger and a palm of the first hand.

15. The apparatus of claim 12, wherein the process of interactive display further comprises:
identifying a virtual object of interest in the plurality of images; and selecting the virtual object of interest in response to the first command.

16. The apparatus of claim 15, wherein the process of interactive display further comprises:
tracking a movement of one of the plurality of gestures;
interpreting the movement of one of the plurality of gestures as a second command; and
displaying a second scene in response to the second command.

17. The apparatus of claim 16, wherein tracking the movement of one of the plurality of gestures comprises:
tracking a movement of a designated point among the plurality of points of interest of the first object of interest, wherein the designated point of interest is associated with the one of the plurality of gestures.

18. The apparatus of claim 15, wherein determining the plurality of gestures corresponding to the plurality of images comprises:
identifying a second object of interest in one of the plurality of images;
identifying a plurality of points of interest of the second object of interest; and
determining gestures of the first and second objects of interest according to the plurality of points of interest of the first and second objects of interest;
wherein the first object of interest is a first hand of a user, the second object of interest is a second hand of the user.

19. The apparatus of claim 18, wherein determining the plurality of gestures corresponding to the plurality of images comprises:
tracking movements of the gestures of the first and second objects of interest;
interpreting the movements of the first and second objects of interest as a second command; and
displaying a second scene in response to the second command.

20. The apparatus of claim 19, wherein tracking the movements of the gestures of the first and second objects of interest comprises:
tracking movements of a first designated point among the plurality of first points of interest of the first object of interest and a second designated point among the plurality of points of interest of the second object of interest, wherein the first and second designated point of interest is associated with the gestures of the first and second objects of interest.

21. The apparatus of claim 12, wherein the process of interactive display further comprises:
identifying a virtual object of interest in the plurality of images, wherein the virtual object of interest comprises a plurality of sub-objects of interest corresponding to a plurality of characters; and
determining one of the plurality of characters corresponding to one of the plurality of sub-objects of interest according to a designated point corresponding to the first command;
wherein displaying the first scene in response to the first command comprises:
displaying a pop up window with the one of the plurality of characters corresponding to the first command.

22. The apparatus of claim 21, wherein determining one of the plurality of characters corresponding to one of the plurality of sub-objects of interest according to the designated point corresponding to the first command comprises:
determining the designated point corresponding to the first command among the plurality of points of interest;
wherein the first object of interest is a first hand of a user, the plurality of points of interest comprises fingertips of the first hand, and the designated point is a fingertip of thumb or a fingertip of index finger of the first hand.

23. The apparatus of claim 12, wherein the interactive display system comprises:
an image sensor coupled to the processing device, and configured to generate the plurality of images to the processing device; and
a display device coupled to the processing device, and configured to display the first scene outputted by the processing device.

24. The apparatus of claim 23, wherein the image sensor is a structured light camera or a time of flight camera, and each of the plurality of images is a 3-dimensional image.

* * * * *